United States Patent [19]

Thordarson

[11] 4,015,626
[45] Apr. 5, 1977

[54] CONSTANT FLOW VALVE FOR LOW FLOW RATES

[75] Inventor: Petur Thordarson, Seattle, Wash.

[73] Assignee: Thordarson, Inc., Seattle, Wash.

[22] Filed: Jan. 22, 1976

[21] Appl. No.: 651,360

[52] U.S. Cl. .................................. 137/375; 137/501
[51] Int. Cl.² .............................................. F16L 7/00
[58] Field of Search .......... 137/501, 545, 209, 510, 137/375; 177/208, 209; 75/141

[56] References Cited

UNITED STATES PATENTS

| | | | |
|---|---|---|---|
| 3,024,803 | 3/1962 | Beremond | 137/501 |
| 3,047,005 | 7/1962 | Karr | 137/501 X |
| 3,765,497 | 10/1973 | Thordarson | 73/141 X |
| R20,964 | 1/1939 | Morton | 137/501 X |

*Primary Examiner*—Harold W. Weakley
*Attorney, Agent, or Firm*—Graybeal, Barnard & Uhlir

[57] ABSTRACT

A constant flow valve for low flow rates employs a tire valve assembly which is threadably received within the downstream end portion of an axial passageway formed in an elongated inlet tube. The tube is received within a stem portion of a first part of an internal housing. A movable wall which is at its periphery clamped between a base portion of such first part and a bell portion of the second part, divides the interior of said housing into upstream and downstream chambers. The stem portion of the tire valve assembly extends into the upstream chamber and contacts the movable wall. A biasing spring is located in the downstream chamber and exerts a biasing force against the movable wall which is in turn transmitted to the control stem. A considerable length of relatively small internal diameter, high flow resistance tubing is coiled about the inlet tube and the stem portion of the first housing part. The upstream end of the tubing communicates with the upstream chamber and the downstream end of the tubing communicates with the downstream chamber. The tubing performs the dual functions of a pressure reducing restriction between the two chambers and a flow rate averager. An external casing surrounds the coil of tubing and at least portions of the inlet tube and the internal housing and a plastic filler material is provided in the exterior casing about the components enclosed thereby. An outlet passageway leads outwardly from the downstream chamber to an outlet fitting.

9 Claims, 4 Drawing Figures

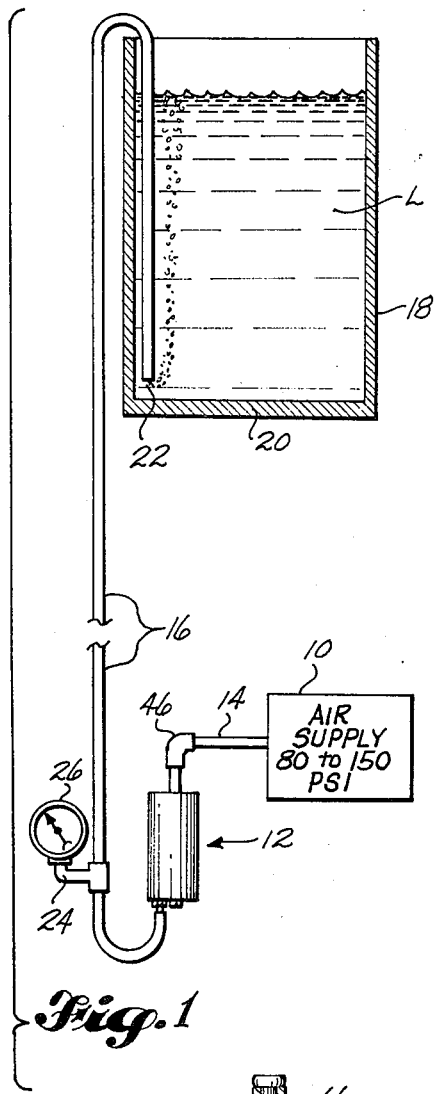
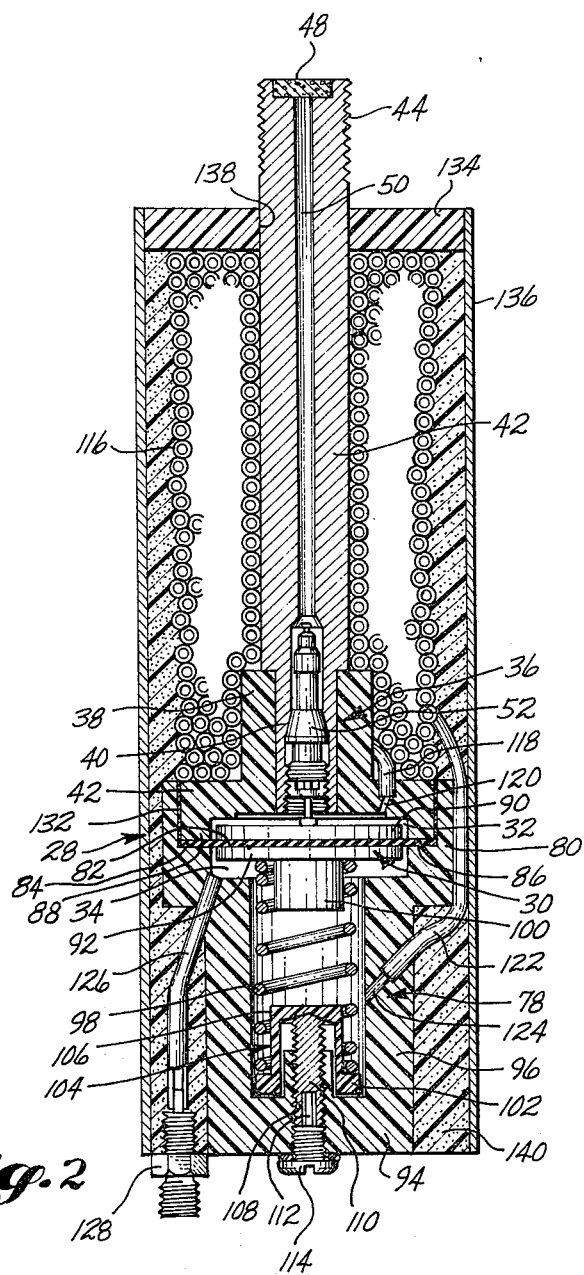
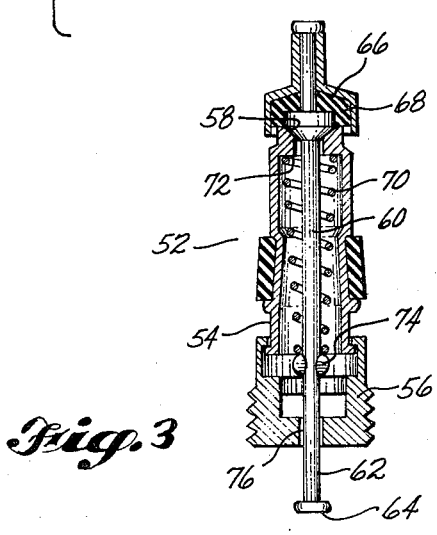

CONSTANT FLOW VALVE FOR LOW FLOW RATES

BACKGROUND OF THE INVENTION

1. Field of the Invention

This invention relates to flow control valves, and more particularly, to a flow control valve capable of accurate regulation at very low flow rates in systems which experience either widely varying inlet pressures or significant temperature variations.

2. Description of the Prior Art

There are systems in which it is desirable to have available a stream of gas or liquid flowing at a very low but constant flow rate. An example of such a system is a pneumatic system for measuring the depth of a liquid in a tank, such as has been used in the pulp and paper industry. In such a system air under pressure is delivered into a constant flow valve and the effluent of such valve is delivered into the body of liquid and discharged therein near the bottom of the tank. Variations in the depths of the liquid are reflected in changes of the back pressure experienced at the outlet of the air pipe. Since the flow through such pipe is constant, the change in the back pressure can be readily measured by a pressure gauge located in such pipe and such pressure gauge can be calibrated, if desired, to provide a direct reading corresponding to the change in the height of the liquid in the tank.

Known flow control valves have proven unsuccessful in such systems in which quite low constant flow rates are desired. This is at least partially due to a wide variation in pressure of the compressed air that is available through use of conventional economically practical means. One type of conventional flow control valves utilizes a pressure differential controlled variable area orifice in series with a fixed orifice or restriction. Another type employs a conventional automatic constant pressure regulator in series with a manually variable flow control orifice. Neither of these arrangements performs satisfactorily in a low flow system throughout the full range of pressures encountered.

Additionally, known flow control valves operating at low flow rates must often be recalibrated when subjected to significant temperature variations. Such valves often use an extremely small diameter orifice to obtain the desired low flow rate and hence any size deviation caused by thermal expansion or contraction will accordingly vary the flow rate through the control orifice. A related problem of known flow control valves capable of operating at low flow rates concerns the size of the restriction through which the regulated fluid must flow. A fluid supply source, typically a pneumatic system employing air, often contains small undesirable solid particles which will collect around a small control orifice and change the flow characteristics through the orifice. Accordingly, after an extended period of use this build up of foreign matter around the orifice restriction is often of sufficient magnitude to change the pre-calibrated flow rate.

Examples of known flow control valves which purportedly produce constant flow at low rates, are disclosed by U.S. Pat. No. 3,028,876, granted Apr. 10, 1962, to J. L. Gratzmuller, and by U.S. Pat. No. 1,699,676, granted Jan. 22, 1929, to Earl S. Rusch. However, it has been found that valves of this type do not actually produce constant flow within the desirable limits at flow rates of about 0.01 cubic feet per hour to about 2.0 cubic feet per hour when used with an economical source of compressed air.

Another type of known flow regulator for controlling ultra-low volumetric flow rates is disclosed by U.S. Pat. No. 3,749,113, granted July 31, 1973, to Jack Isreeli, Aaron Kassel, and Edwin H. Mernyk. This patent is of interest because it presents a very good discussion of the various problems encountered which make it difficult to accurately regulate flow at ultra-low volumetric flow rates. However, the valve proposed by this patent represents a different approach to solving the problem than I have taken.

SUMMARY OF THE INVENTION

The constant flow valve of this invention basically comprises a pressure differential controlled variable area orifice in series with a substantial length of relatively small internal diameter, high flow resistance tubing which performs the dual functions of a pressure reducing restriction and a flow rate averager.

According to an aspect of the invention, the constant flow valve includes housing means defining an internal cavity. A movable wall means within the housing means divides the internal cavity into upstream and downstream chambers. Tubular means defining an elongated fluid passageway has an upstream end in communication with a source of fluid under pressure and a downstream end in communication with the upstream chamber. The variable area orifice is located within the elongated fluid passageway. The size of the orifice is controlled by an elongated control stem extending downstream of the control orifice into the upstream chamber. The control stem has a downstream end in contact with the movable wall means and a valve plug at its upstream end operable to increase the size of the control orifice when the control stem is moved upstream and to decrease the size of the control orifice when the control stem is moved downstream. The high flow resistance tubing is coiled about at least a portion of the tubular means which defines the elongated fluid passageway. Such tubing has an inlet communicating the upstream chamber and an outlet communicating with the downstream chamber. A biasing spring within the downstream chamber urges the movable wall against the control stem in the upstream direction an amount resulting in the control orifice normally being partially open. Pressure variations between the two chambers serve to move the movable wall and said control stem, to in that manner increase or decrease the size of the control orifice. An outlet passageway leads from the downstream chamber outwardly from the constant flow valve.

According to another aspect of the invention, the coil of tubing and the housing means are located within an external casing and a plastic filler material is provided within the external casing about the components enclosed thereby. Preferably, the high flow resistance tubing and the housing are made from plastic materials. These materials and the plastic filler material have relatively good insulative properties, making the constant flow valve relatively insensitive to temperature changes.

In accordance with a further aspect of the invention, the control orifice and the elongated control stem exist in the form of a tire valve assembly which is threadably received within the tube means which defines the inlet passageway to the upstream chamber.

In preferred form, the biasing means for urging the movable wall against the control stem is adjustable an amount sufficient to vary the flow rate through the control orifice between the limits of 0.01 and 2 cubic feet per hour.

It is an object of the present invention to provide a flow regulator which is capable of accurate regulation of ultra-low volumetric flow rates of gases or liquid when used with conventional fluid supply devices.

Another object of the invention is to provide such a constant flow regulator which is composed of small number of fabricated parts in combination with readily available components, rendering it relatively inexpensive to manufacture.

Still another object of the invention is to provide a constant flow valve which maintains its initial calibration over a wide range of temperature variations.

It is a further object of the invention to provide a constant flow regulator which is relatively insensitive to temperature variations.

It is yet another object of the invention to provide a constant flow valve capable of relatively low flow rates which has a passageway therethrough free of small restrictions.

Yet another object of the invention is to provide a constant flow valve which is extremely simple in construction but yet is very stable in operation and is durable in construction.

These and other features, objects and advantages of the present invention will be apparent from the following detailed description, taken in conjunction with the accompanying drawing.

BRIEF DESCRIPTION OF THE DRAWING

FIG. 1 is a diagrammatic view of a liquid depth measuring system utilizing a constant flow valve constructed in accordance with the present invention;

FIG. 2 is an axial sectional view of a preferred embodiment of the invention, with some parts shown in elevation, for clarity of illustration;

FIG. 3 is an enlarged scale view, partially in axial section and partially in elevation, of a common tire stem valve assembly which is utilized in the preferred embodiment to provide the variable orifice used for controlling flow.

DETAILED DESCRIPTION OF THE PREFERRED EMBODIMENT

Figure 4:
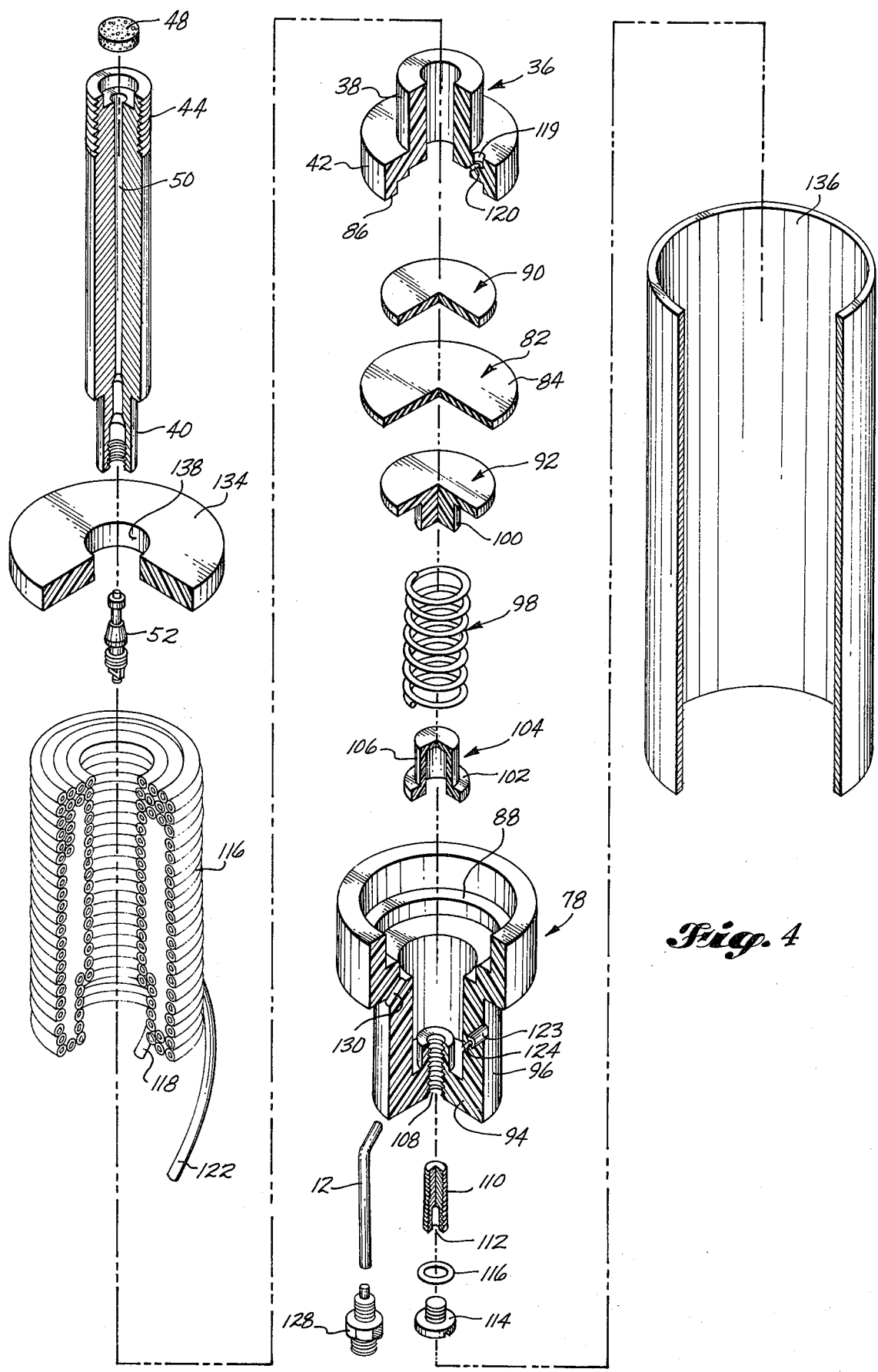
FIG. 4 is an exploded pictorial view of the preferred embodiment, developed on a center line which is divided into three sections so that all parts of the valve can be shown on a single sheet on a relatively large scale.

One possible use of the constant flow valve of the present invention is diagrammatically shown in FIG. 1 of the drawing. In the illustrated system, compressed air, which may vary in pressure between about 80 to about 150 psi, is supplied from a source 10 to a constant flow valve 12 constructed according to the present invention, via a supply line 14. In a manner to be hereafter described, the valve 12 regulates the flow of air so that a constant flow of air leaves valve 12 via conduit 16 at a very low flow rate. Conduit 16 delivers the air into a tank 18 and, as illustrated, discharges it closely adjacent the bottom 20 of tank 18. Variations in the depth of the liquid L within tank 18 cause corresponding variations in the back pressure acting on the fluid being emitted from the outlet opening 22. The variations in back pressure are measured by a pressure gauge 24 located in conduit 16. If desired, the pressure gauge 24 can be calibrated so that variations in depth of a liquid L can be directly read on the face 26 of the gauge 24.

The system shown by FIG. 1 requires a flow rate through conduit 16 within a range of about 0.01 to about 2.0 cubic feet per hour. It is important that the constant flow valve 12 be able to deliver the fluid at this relatively low flow rate despite relatively large fluctuations in pressure of the fluid from source 10.

A preferred embodiment of the constant flow valve of this invention will now be described, with reference to FIGS. 2 – 4.

Preferably, the valve 12 comprises a two part internal housing 28 defining an internal cavity. A movable wall means 30 divides the cavity into upstream and downstream chambers 32, 34. Housing part 36 includes a tubular stem portion 38 which receives the downstream end portion 40 of an elongated inlet tube 42. The upstream end portion 44 of inlet tube 42 may be externally threaded, to provide a way of connecting it to a fitting portion of the air supply conduit 14, shown in FIG. 1 in the form of a standard elbow fitting 46. In a manner which is conventional per se, the inlet end of inlet tube 42 may be provided with a filter 48 for removing unwanted particulate material that might exist in the compressed air.

In preferred form, a control orifice and means for varying the area of such orifice are located within a portion of the elongated axial passageway 50 which extends through inlet tube 42. In the preferred embodiment, such orifice and the control means therefore are supplied by a conventional tire valve assembly 52 which is adapted to be screwed into the downstream end of the inlet tube 52 in the manner shown by FIG. 2.

Referring to FIG. 3, the standard tire valve assembly 52 may comprise a tubular body 54 having an exteriorly threaded end portion 56 and an end orifice 58 at its opposite end. A control member, hereinafter referred to as a control stem, extends axially through the tubular body 54. It includes a downstream end portion 62 which extends axially beyond the threaded portion 56 and terminates in an enlarged end portion 64. The opposite end of control stem 60 is connected to a valve plug 66 which may include a body of resilient material 68 arranged to seat against the end surface of tubular body 54, about the control orifice 58. A coil spring 70 is located within tubular body 54, in surrounding relationship to the control stem 60. The upstream end of spring 70 abuts against an internal shoulder 72 formed within body 54. The downstream end of spring 70 abuts against a laterally projecting portion 74 of the control stem 60. The spring 70 is always slightly compressed so that it normally biases the valve plug 66 into a seated position.

As is well known, when a valve such as valve assembly 52 is used in a pneumatic tire or the like, it functions as an off-on valve. The spring 70 keeps the valve plug 66 seated, and hence the valve orifice closed, until it is desired to either put air into the tire or let it out. Then, the control stem 60 is depressed so as to further compress the spring 70. Such movement of valve stem 60 in turn moves the valve plug 66 away from its seated position, allowing flow either into or out from the tire via the passageway extending axially through the body 54. Such passageway includes an annular portion 76, the hollow interior of body 54, and the orifice 58. In the constant flow valve of this invention, the tire valve assembly 52 does not function merely as an off-on type valve, but rather performs as a very inexpensive but quite reliable variable orifice valve.

Referring again to FIGS. 2 and 4, the stem portion 38 of valve part 36 is connected to a larger diameter tubular base portion 42. Base portion 42 is snuggly received within the end recess of an enlarged end portion of the second housing part 78 which may refer to as a bell portion 80.

Preferably, the movable wall 30 comprises an elastomeric diaphragm 82 having a peripheral portion 84 which is clamped between an end surface 86 of housing part 36 and an internal shoulder portion 88 of housing part 78. In preferred form, the movable wall 30 also includes rigid plate portions 90, 92, on opposite sides of the central portion of diaphragm 82.

The lower end (as pictured) of housing part 36 is axially recessed to form the upstream chamber 32. When the tire valve assembly 52 is positioned within inlet tube 42, and inlet tube 42 is joined to stem portion 38 of housing part 36, the projecting portions 62, 64 of control stem 60 are located within the upstream housing 32, and end portion 64 is in contact with plate 90.

Housing part 78 includes an end wall 94 at its end opposite bell 80, and a tubular side wall 96 extending between end wall 94 and bell 80. The hollow interior of housing part 78 constitutes the downstream chamber 34. It includes a cup-like portion defined by side wall 96 and end wall 94 which opens upwardly towards the housing part 36. A biasing spring, in the nature of a coiled compression spring 98, is located within the cup-like cavity of housing part 78. A stabilizing projection 100 may depend downwardly from plate 92 into the interior of spring 98. The opposite end of spring 98 bears against a flange portion 102 of a loading member 104. For stability purposes, loading member 104 includes an axial portion 106 which extends into the interior of spring 98 from the end thereof opposite projection 100. The end wall 94 is constructed to include a threaded axial opening 108 in which an adjustment screw 110 is received. Adjustment screw 110 may include a hexogonal socket 112 in its lower (as pictured) end for receiving an Allen wrench. The wrench end of adjustment screw 110 may be countersunk, as pictured, and the countersink opening may be provided with a closure screw 114 which is in place except for the times when it is desired to adjust the position of screw 110, and in turn the amount of energy stored in compression spring 98. A conventional O-ring seal member 116 may be provided between the head of closure screw 114 and the adjoining portion of end wall 94.

According to the invention, a substantial length of small diameter capilliary tubing 116 is provided to perform the dual functions of a pressure reducing restriction between the two chambers 32, 34 and a flow rate averager for the fluid which flows through the valve 12. As shown by FIG. 2, the upstream end portion 118 of tubing 116 is received within a socket 119 (FIG. 4) formed in base portion 42 of housing part 36. The base of such socket 119 communicates with a port 120 leading into chamber 32. The main portion of tubing 116 is coiled about tubular stem 38 and inlet tube 42, or an equivalent arrangement in some other embodiment. The downstream end portion 122 extends downwardly (as pictured) from the coil alongside of the internal housing 28 and at its end is plugged in a socket 123 (FIG. 4) formed in tubular side wall 96. This socket communicates with a port 124 leading from the base of the socket into the downstream chamber 34.

A short length of tubing 126 provides an outlet passageway from chamber 134 to an outlet fitting 128. As shown in FIG. 2, the upstream end of tubing 126 is received within a port 130 (FIG. 4) formed through a wall portion of the housing part 78.

I have found that in order to achieve a constant flow at flow rates between 0.01 – 2.0 cubic feet per hour it is necessary to use a quite long length of capilliary tubing 116. A plastic capilliary tubing having a 1/16th inch outside diameter, and a 0.035 inch inside diameter, proved to perform quite satisfactorily when used at lengths of 35 feet or more. This tubing is manufactured from polyethylene or like material and has been fabricated by the Liquid Nitrogen Processing Company of Los Angeles, California. I tried using a small diameter pressure reduction orifice in place of the tubing 116 and found that it did not function satisfactorily, due in part to particle build up in the orifice and size deviation with temperature variations, to provide a constant flow throughout the full range of fluid pressures that were encountered. The fluctuation in fluid pressure from the source, e.g. typically between 80 – 150 psi in the system diagrammatically illustrated in FIG. 1, causes frequent movements of the control stem 60 and the valve plug 66. This cyclic action of valve plug 66 results in a transparent flow through control orifice 58 which must be averaged into a constant flow. I have observed the tire valve assembly to operate at about 10 cycles per second. Accordingly, the flow rate varies back and forth between a rate slightly higher and a rate slightly lower than the desired rate. I have found that by use of the high flow resistance tubing 116 the fluid which flows through control orifice 58 has its flow rate averaged within the tubing 116, so that the flow rate out from outlet fitting 128 is at a substantially constant value and is within the desired limits throughout the full range of pressure variations encountered.

Additionally, I have found the constant flow valve according to the instant invention to be extremely stable over a wide range of temperature variations and to maintain its initial calibration over extended periods of use. For example, heretofore known low flow control valves were initially calibrated for a given flow rate at a certain ambient temperature. If such low flow control valves were used at a significantly different ambient temperature with respect to that of the initial calibration, the flow rate would deviate from the initial setting. Accordingly, if the flow valve were used in conjunction with a load measuring system, such as described in my prior U.S. Pat. No. 3,765,497, granted Oct. 16, 1975 for a HYDRAULIC COMPRESSION LOAD CELL, the gauge would given an erroneous indication of the applied load. In operation, I have found the initial calibration is still substantially maintained even when regulating a gas over a temperature range of 75° F to −50° F.

Preparatory to use of the valve 12, the loading screw 110 is adjusted to put a desired loading on the bias spring 98 and in turn the control stem 60. The force of spring 98 acting on movable wall 30 exerts a force on control stem 60 in opposition to spring 70 which is sufficient to unseat the valve plug 66, so that the control orifice 58 is normally open. The position of loading screw 110 determines the normally open size of control orifice 58.

In operation, compressed air or some other fluid under pressure is delivered from source 10 through supply conduit 14 into the inlet tube 44. The fluid flows through passageway 50, then through control orifice 58 into the upstream chamber 32. From upstream chamber 32 it flows into and through the capilliary tubing 116. From capilliary tubing 116 it flows through port 124 into the downstream chamber 34. Then, from chamber 34 it flows out from the valve 12 via outlet passageway 126 and outlet fitting 128.

The tubing 116 functions as a pressure reducing restriction between chamber 32, 34. Thus, it renders the movable wall 30 sensitive to pressure variations. If an increase in pressure occurs in upstream chamber 32, the fluid in chamber 32 exerts an increased force on movable wall 30 in opposition to spring 98. This differential force compresses spring 98 slightly. This moves plate 90 downwardly (as pictured), allowing tire valve assembly spring 70 to move the control stem 60 relatively downwardly. This results in movement of the valve plug 66 in a direction causing a decrease in the size of control orifice 58. The sought after objective is to have the higher pressure in passageway 50 and the smaller size control orifice 58 combine to deliver the sought after flow rate through control orifice 58.

As should be evident, whenever there is a relative decrease in fluid pressure in passageway 50, and hence in upstream chamber 32, the force on plate 90 is lessened, allowing the stored energy in spring 98 to move the movable wall, and hence control stem 70 and valve plug 66, upwardly (as pictured). This movement results in an increase in the size of control orifice 58 an amount such that the increased orifice size and the lower fluid pressure will combine to still produce the desired flow through the control orifice 58. As earlier stated, it was found that the use of a conventional pressure reducing restriction between the upstream and downstream chambers 32, 34 did not result in the desired flow rate throughout the full range of pressures that were encountered. The substantial length of capilliary tubing 116 was provided in place of the conventional restriction and it was found that it made the valve 12 function quite satisfactorily throughout the full range of supply pressures.

As previously stated, it is an object of the invention to provide a constant flow valve for use in relatively low flow rate systems which is not only functionally adequate, but also relatively inexpensive to manufacture and hence can be made available to the consumer at a relatively low price. The use of the tire valve assembly 52 contributes to this objective. Further contributing factor to a lessening of manufacturing cost is the manner in which the other portions of the valve are manufactured and arranged. Preferably, the two inner housing parts 36, 78 are injection molded from a suitable plastic material, such as nylon 12 or an equivalent. The movable wall 30 is set into place and the base portion of housing part 36 is merely plugged into the bell portion 80 of housing part 78. The two housing parts are preferably glued together at 132. The end portions 118, 122 of the tubing 116 are merely plugged into its opening 130. The inlet tube 42 is plugged into stem portion 58. Of course, this is done after the tire valve assembly 52 is screwed into the inboard end of inlet tube 42.

According to an aspect of the invention, an annular end wall 134 may be provided at one end of the valve 12, e.g. the upstream end. End wall 134 serves as both an end closure and a centering member for an exterior casing 136. The inlet tube 44 is snuggly received within a center opening 138 formed in end wall 134 and the outer diameter of end wall 134 is snuggly received within the exterior casing 136. As shown by FIG. 2, the casing 136 may extend downwardly to where its lower end (as pictured) substantially lies in a common plane with the outer surface of end wall 94. A liquid plastic substance which sets up into a solid is introduced into the remaining spaces in external casing 136 about the coil of tubing 116, the interior housing 28, and the outlet conduit 126. The filler material 140 holds all the parts together and makes a truly integral assembly. Preferably, the use of the plastic materials for members 134, 36, 78, 116, and the use of the plastic filler material 140, makes the valve 12 relatively insensitive to temperature variations. This is because these plastic materials have quite good insulative properties. They themselves do not expand or contract much when exposed to varying temperature conditions, and they insulate the metal parts so that they are less influenced by at least variations in external temperature.

The above described embodiment is to be considered in all respects as merely being illustrative and not restrictive. The scope of the invention is to be determined by the appended claims rather than by the foregoing description. It is intended that all changes in construction which come within the meaning and range of equivalency of the claims are to be embraced by the claims.

What is claimed is:

1. A constant flow valve for use in relatively low flow rate systems, comprising:

housing means defining an internal cavity;

movable wall means within said housing means, dividing said cavity into upstream and downstream chambers;

means defining an elongated fluid passageway extending perpendicularly of said movable wall means and having an upstream inlet end connectible with a source of fluid under pressure and a downstream end in communication with said upstream chamber;

means defining a control orifice within said elongated fluid passageway;

means for varying the size of said control orifice including an elongated control stem within said elongated fluid passageway extending downstream from said control orifice also perpendicularly of said movable wall means, said control stem having a downstream end in contact with said movable wall means and a valve plug at its upstream end operable to increase the size of said control orifice when the control stem is moved upstream and to decrease the size of said control orifice when the control stem is moved downstream;

a substantial length of relatively small internal diameter, high flow resistance tubing coiled about at least a portion of the means defining said elongated fluid passageway, said tubing having an inlet communicating with said upstream chamber and an outlet communicating with said downstream chamber, said tubing providing a small diameter fluid passageway extending from the upstream chamber to the downstream chamber and performing the dual functions of a pressure reducing restriction between the two chambers and a flow rate averager, so that a substantially true constant flow rate emits from said tubing;

bias means within said downstream chamber for urging the movable wall against the control stem in the upstream direction an amount resulting in the control orifice normally being partially open, with pressure variations between the two chambers serving to move said movable wall and said control stem, to increase or decrease the size of the control orifice, so that the flow rate through the control orifice and into the tubing is averageable to a substantially true constant flow rate; and outlet passageway means of fixed size leading from the downstream chamber, outwardly from said constant flow valve.

2. A constant flow valve for use in relatively low flow rate systems, comprising:

housing means defining an internal cavity;

movable wall means within said housing means, dividing said cavity into upstream and downstream chambers;

means defining an elongated fluid passageway having an upstream inlet end connectible with a source of fluid under pressure and a downstream end in communication with said upstream chamber;

means defining a control orifice within said elongated fluid passageway;

means for varying the size of said control orifice including an elongated control stem extending downstream from said control orifice, said control stem having a downstream end in contact with said movable wall means and a valve plug at its upstream end operable to increase the size of said control orifice when the control stem is moved upstream and to decrease the size of said control orifice when the control stem is moved downstream;

a substantial length of relatively small internal diameter, high flow resistance tubing coiled about at least a portion of the means defining said elongated fluid passageway, said tubing having an inlet communicating with said upstream chamber and an outlet communicating with said downstream chamber, said tubing providing a small diameter fluid passageway extending from the upstream chamber to the downstream chamber and performing the dual functions of a pressure reducing restriction between the two chambers and a flow rate averager, so that a substantially true constant flow rate emits from said tubing;

bias means within said downstream chamber for urging the movable wall against the control stem in the upstream direction an amount resulting in the control orifice normally being partially open, with pressure variations between the two chambers serving to move said movable wall and said control stem, to increase or decrease the size of the control orifice, so that the flow rate through the control orifice and into the tubing is averageable to a substantially true constant flow rate;

outlet passageway means leading from the downstream chamber, outwardly from said constant flow valve; and wherein said housing means is divided into first and second parts, said first part comprising a tubular base portion of a first diameter and a smaller diameter tubular stem portion extending axially upstream from said base portion and constituting a part of the means which defines the elongated fluid passageway, said second part comprising an end wall and tubular side wall means defining a cup-like cavity opening towards said first part, said second part also having an enlarged bell portion at its end opposite said end wall in which the base portion of said first part is received, with said movable wall means being clamped at its periphery between said first and second parts, with the interior of said tubular base portion constituting the said upstream chamber, and with said cup-like cavity constituting the downstream chamber and housing said bias means.

3. A constant flow valve according to claim 2, wherein the means defining the elongated fluid passageway also includes an elongated inlet tube having a downstream end connected to the tubular stem portion of the first part of the inner housing, with said high flow resistance tubing being coiled about at least a substantial portion of said elongated inlet tube.

4. A constant flow valve according to claim 3, further comprising external casing means enclosing the coil of high flow resistance tubing and at least portions of the elongated inlet tube and the said housing means, and a plastic filler material within said external casing means about the coil of high flow resistance tubing and the housing means enclosed by said external casing means.

5. A constant flow valve according to claim 4, wherein said high flow resistance tubing and said housing means are made from plastic materials, and wherein such materials and said plastic filler material all have relatively good insulative properties, making the constant flow valve relatively insensitive to temperature changes.

6. A constant flow valve according to claim 4, including first and second ports in said tubular side wall means, said high flow resistance tubing having a downstream end portion extending from said coil outwardly adjacent said housing means to said first port, with the outlet of said tubing being connected to said first port, said outlet passageway means including a length of tubing extending from said second port generally axially adjacent said tubular side wall means, and said filler material embedding both the downstream end portion of said high flow resistance tubing and said length of tubing.

7. A constant flow valve according to claim 2, wherein said movable wall means comprises a diaphragm of flexible material clamped at its periphery between said first and second parts, and rigid central plate portions on opposite sides of said diaphragm, and wherein said bias means within said downstream chamber comprises a coil spring located within said cup-like cavity, said coil spring having a first end portion in contact with the central plate portion on the downstream chamber side of the diaphragm and a second end portion, a movable loading member located between said second end portion and the end wall of the second port of said housing means in contact with the second end portion of said spring, a loading screw threadably received within a threaded axial opening in the end wall of the second part of said housing means, said loading screw being adjustable axially in position for the purpose of varying the position of said loading member to in turn vary the force of the compression spring on the control stem, to in that manner adjust the static size of the control orifice.

8. A constant flow valve for use in relatively low flow rate systems, comprising:

housing means defining an internal cavity;

movable wall means within said housing means, dividing said cavity into upstream and downstream chambers;

means defining an elongated fluid passageway having an upstream inlet end connectible with a source of fluid under pressure and a downstream end in communication with said upstream chamber;

means defining a control orifice within said elongated fluid passageway;

means for varying the size of said control orifice including an elongated control stem extending downstream from said control orifice, said control stem having a downstream end in contact with said movable wall means and a valve plug at its upstream end operable to increase the size of said control orifice when the control stem is moved upstream and to decrease the size of said control orifice when the control stem is moved downstream;

a substantial length of relatively small internal diameter, high flow resistance tubing coiled about at least a portion of the means defining said elongated fluid passageway, said tubing having an inlet communicating with said upstream chamber and an outlet communicating with said downstream chamber, said tubing providing a small diameter fluid passageway extending from the upstream chamber to the downstream chamber and performing the dual functions of a pressure reducing restriction between the two chambers and a flow rate averager, so that a substantially true constant flow rate emits from said tubing;

bias means within said downstream chamber for urging the movable wall against the control stem in the upstream direction an amount resulting in the control orifice normally being partially open, with pressure variations between the two chambers serving to move said movable wall and said control stem, to increase or decrease the size of the control orifice, so that the flow rate through the control orifice and into the tubing is averageable to a substantially true constant flow rate;

outlet passageway means leading from the downstairs chamber, outwardly from said constant flow valve; and wherein said control orifice and said elongated control stem are parts of a tire valve assembly which is received within said elongated fluid passageway.

9. A constant flow valve according to claim 8, wherein said tire valve assembly comprises a tubular body having the control orifice at its upstream end, an externally threaded portion at its downstream end, and an axial passageway extending therethrough, with said control stem extending axially through said passageway, with the downstream end of said control stem extending axially outwardly from the downstream end of said tubular body, and with the said valve plug being located axially outwardly of the upstream end of the tubular body, said means defining said elongated fluid passageway means including internal threads into which the threaded portion of the tire valve assembly is threadably received, said tire valve assembly including a coil spring within said tubular body, surrounding said control stem, said tubular body including an internal shoulder at its upstream end against which one end of said spring abuts and said control stem including means against which the opposite end of said spring abuts, so that such spring normally tends to urge the valve plug into a seated position.

* * * * *